United States Patent [19]
Ambrose-Ritchey et al.

[11] Patent Number: 4,789,609
[45] Date of Patent: Dec. 6, 1988

[54] BATTERY SEPARATOR

[75] Inventors: Geneva Ambrose-Ritchey; Felek Jachimowicz, both of Columbia; Joseph T. Lundquist, Jessup, all of Md.

[73] Assignee: W. R. Grace & Co.-Conn., New York, N.Y.

[21] Appl. No.: 133,592

[22] Filed: Dec. 14, 1987

[51] Int. Cl.$^4$ .............................................. H01M 2/16
[52] U.S. Cl. ..................................... 429/144; 429/254
[58] Field of Search ............... 429/144, 249, 251, 252, 429/254

[56] References Cited

U.S. PATENT DOCUMENTS

| | | | |
|---|---|---|---|
| 2,968,686 | 1/1961 | Duddy | 429/145 |
| 4,287,276 | 9/1981 | Lundquist et al. | 429/254 |
| 4,434,215 | 2/1984 | Wszolek et al. | 429/144 |
| 4,513,121 | 4/1985 | Hansson et al. | 525/333.1 |
| 4,539,277 | 9/1985 | Ishigaki et al. | 429/249 |

Primary Examiner—Donald L. Walton
Attorney, Agent, or Firm—Howard J. Troffkin

[57] ABSTRACT

A sheet product useful as a battery separator which is formed from a cationic polymer membrane free of hydrolyzable groups and, preferably, is part of a multi-ply sheet product composed of at least one ply of the cationic membrane and at least one ply of a microporous polyolefin sheet.

23 Claims, No Drawings

BATTERY SEPARATOR

BACKGROUND OF THE INVENTION

The subject invention is directed to a sheet product which is useful as separators in batteries.

Storage batteries have at least one pair of electrodes of opposite polarity and, generally, have a series of adjacent electrodes of alternating polarity. The current flow between these electrodes is maintained by an electrolyte which can be acid, alkaline or substantially neutral depending on the nature of the battery system. Alkaline batteries have found favor recently because of their high energy density and ability to form secondary rechargable battery systems.

Separators are located in the batteries between adjacent electrodes of opposite polarity to prevent direct contact between the oppositely charged electrode plates while freely permitting electrolytic conduction. Contact between plates may be due to imperfections in the plate structure or due to warping or wrinkling of the plate during use. Contact may also be due to the formation of dendrites or localized needlelike growths which tend to form on the electrodes, such as zinc dendrites in an alkaline nickel-zinc battery system. The ability to produce a separator membrane which can effectively act as a dendristatic diaphragm and inhibits shape change of the electrodes is a required criteria for forming an effective battery system.

It is generally agreed that separators should be (a) thin and light weight to aid in providing a battery of high energy density, (b) resistant to degradation and instability with respect to the battery components with which it is in contact, (c) capable of exhibiting a high degree of electrolytic conductivity (low electrolytic resistance) and (d), in battery systems where appropriate, capable of inhibiting formation and growth of dendrites and electrode shape change. The first two elements and the last two elements are each thought to be counter productive with respect to each other. For example, very thin sheets have a high surface area to volume ratio and are, therefore, more susceptible to attack by the other battery components (i.e. electrolyte) and by oxidation. With respect to the latter two criterias, it is known that separator membranes which are nonporous normally exhibit a high degree of inhibition to dendrite formation while having only low degrees of electrolytic conductivity. Microporous separators, that is those with discrete pores, usually have a high degree of electrolytic conductivity but are not able to inhibit dendrite shorting. Finally, membrane and microporous separators presently used are not capable of inhibiting electrode shape changes which normally occur during usage, especially in recycling of rechargeable systems.

SUMMARY OF THE INVENTION

The present invention is directed to a sheet product capable of exhibiting the combination of desired properties described above. The sheet product is in the form of a substantially non-porous cationic membrane composed of a polymer having a high degree of cationic groups therein and free of hydrolyzable groups and, preferably, to a multi-ply sheet product having at least one ply of the cationic membrane and at least one ply composed of a microporous, polyolefinic sheet.

DETAILED DESCRIPTION OF THE INVENTION

The instant invention is directed to a single- or multi-ply sheet product having at least one ply formed from a crosslinked cationic polymeric membrane and, preferably, also having at least one ply formed of a microporous polyolefin sheet.

For purposes of clarity, some of the terms used herein and in the appended claims to describe the instant invention are defined herein below:

A "sheet" is intended to define a unitary article having a large surface with respect to its length and breadth and having a thickness of about 0.025 cm. or less and preferably less than about 0.01 cm. The sheet may be a freestanding article or formed as a coating on a substrate sheet.

A "membrane" is a sheet which is substantially non-porous and/or does not rely upon porosity to provide electrolytic conductivity through the sheet.

A "microporous sheet" is a sheet having open cell porosity which are discernible only by microscopic examination and in some instances only by electron microscopic examination. The pores of such sheets are normally less than about 5 microns and preferably less than about 0.5 microns in average diameter.

A "sheet product" is a term used to describe the ultimate product of the present invention and can be formed of either a single sheet or a multiple of sheets.

A "multi-ply sheet product" is a sheet product having at least one sheet formed from a membrane composed of a cationic polymer and at least one sheet composed of a microporous sheet.

The cationic polymer membrane providing the single ply sheet product separator of the present invention can be formed from certain known cationic polymers. The polymeric cationic groups, normally in the form of quaternary ammonium groups, should make up at least about 4 and preferably at least 10 percent by weight of the polymer. The polymer must also be capable of being sufficiently cross-linked to cause the cationic polymer to be insoluble in aqueous solutions. The cross-linkage of the polymer can be achieved by either free radical technique using conventional free radical initiators which will activate at a low processing temperature, such as from 50° C. to 125° C., to cause covalent bonding between the polymer chains, and/or by chemical reaction between polymer reactive sites, such as primary amino secondary amino, hydroxyl groups and the like and a chemical reagent capable of reacting with such polymer reactive groups.

The cationic polymer must be free of groups, such as esters, amides, aldehydes, phenyl methylene ammmonium or phenyl ammonium and the like groups, which are capable of hydrolyzing under the environmental conditions provided by an alkaline battery in which it is intended to be a component. In this case, the environmental condition provided by the alkaline electrolyte is normally the controlling factor.

Cationic polymers suitable for use in forming at least one ply of the separator of the instant invention include cationic polyvinyl pyrridine, quaternized polyvinylamine, polydimethyldialkyl ammonium chloride, and quaternized aminomethylated polybutadienes and the like which have been sufficiently cross-linked to provide a water-insoluble film forming material.

Although the above described cross-linked cationic polymers are suitable for use as separators in alkaline batteries, the most preferred cationic polymers for the presently described purpose are formed from a unique polymer structure having a substantially saturated hydrocarbon polymer backbone chain; having pendant alkylene secondary and/or tertiary amino groups and quaternary ammonium groups; being sufficiently cross-linked through quaternary ammonium groups to form a high molecular weight, water insoluble polymer. The resultant polymer has an extremely high charge density. This preferred polymer shall be used herein as illustrative of cationic polymers useful in forming the sheet product of the present invention. This polymer can be formed by first aminomethylating ethylenic (olefinic) bond containing polymers such as polybutadiene, isoprene and the like, under conditions to cause high amine incorporation. The resultant polymeric polyamine is then modified by chain extension and/or cross-linking and also by quaternization to produce a resultant product having the desired charge density and molecular weight distribution. This type of polymer and methods of forming the same are fully described in U.S. Pat. Nos. 4,513,121 and 4,526,936, the teachings of which are incorporated herein by reference. U.S. Pat. No. 4,526,936 describes the formation of polymeric polyamines and U.S. Pat. No. 4,513,121 describes quaternized and cross-linked products of the polyamine. The present product requires the use of high molecular weight starting polymers or higher cross-link density than described in these referenced applications to provide the presently required water-insoluble, film forming product.

The preferred cationic polymers are formed from ethylenic containing polymers are reacted with carbon monoxide, hydrogen and a primary or secondary amine in the presence of catalytic amount of a Group VIII (of the Periodic Chart) metal compound such as inorganic salts, inorganic carbonyls and the like or organometallic compounds such as carboxylic acid salts, chelates such as of norbornadiene and the like. The metal is preferably selected from the Group VIII metals of rhodium, ruthenium, iridium or mixtures thereof. When such mixtures of metals are used they are normally in a ratio of 1000:1 to 1: 1000 with 100:1 to 1:100 being preferred. The carbon monoxide and hydrogen are normally present in a molar ratio of from about 10:1 to 1:10 with from 2:1 to 1:2 being preferred. The amine used may be a primary or secondary amine having $C_1$–$C_6$ (preferably $C_1$–$C_3$) alkyl groups. The preferred amines are secondary amines.

Such formed polymeric polyamine have a high degree, generally of greater than about 40 percent and preferably greater than about 60 percent, incorporation of alkylene (preferably $C_1$–$C_3$) amino pendant groups based on the original olefinic content of the polymer. This is achieved by the combined use of a Group VIII metal catalyst, hydrogen and high pressure. Further, substantially all of the residual olefinic groups, of the polymer are hydrogenated under the above conditions. The polymeric polyamine may contain residual olefinic groups such as less than about 10 percent of that originally contained in the polymer. It is most preferred that the polymer be substantially completely saturated.

The formed aminomethylated polymer is further reacted in known manners to cause quaternization of the amino groups and cross-linking of the polymer (either via the polymer backbone or via reaction with the amino groups) to achieve a polymer of high charge density and stability. The cross-linking of the polymer chains can be accomplished through the reactivity with the amino groups. When the pendant amino groups are secondary amines (from aminomethylation with primary amine) or the preferred tertiary amino group (aminomethylation with secondary amines) they can provide crosslinking and quaternaization when reacted with poly-functional agents which react with such amino groups such as dihalides polyepoxides and epoxy halides.

The result polymer can be characterized by the formula

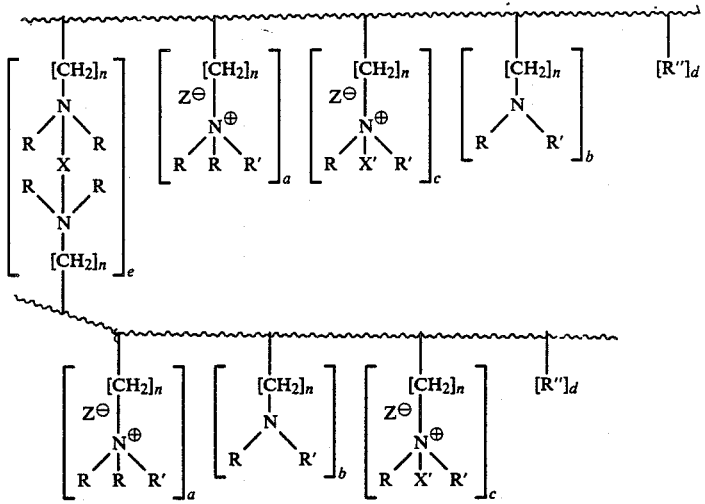

wherein each R independently represents a $C_1$–$C_6$ cycloalkyl or aryl group, preferably a $C_1$–$C_3$ alkyl; R' represents hydrogen or an R group; R" represents hydrogen or comonomer pendant group or both; X is a residual organic group of a polyfunctional compound capable of reacting with at least two amino groups of the polyamine; X' is a residual organic group having at least one unreacted functional group capable of reacting with secondary or tertiary amine or secondary hydroxyl group; ~~~ represents a substantially saturated hydrocarbon polymer chain; Z represents a counterion; n is an integer of from 1 to 3, preferably 1; and a, b, c, d and e are each integers such that a and b are each from about 1 to 90 percent, c is up to about 1, preferably less than 0.5 percent, d is from about 1 to 60 percent and e is from about 1 to 30 percent of the total sum of a+b+c+d+e and the sum of the groups a, b and c is at least 4, preferably at least 10 weight percent of the polymer product.

The crosslinking of any of the cationic polymers described above must be high enough to achieve the molecular weight and/or cross-linking network of the polymer sufficient to provide a water insoluble film forming product. The resultant polymer product should have a weight average molecular weight of greater than 100,000 and preferably greater than 1,000,000. The exact molecular weight will depend on the degree of amino groups present, the molecular weight of the starting polymer and the degree of cross-linking which is necessary to form the water insoluble, film forming product. The cationic polymer membrane can be formed into a sheet product through conventional methods, such as casting, extrusion or pressing of the polymer into sheet form. When casting, for example, a solution of the cationic polymer can be cast onto an inert surface in the presence of a cross-linking agent and then heated to remove solvent and induce cross-linking to form a water-insoluble film suitable for use as a separator.

The preferred embodiment of the subject invention is a multi-ply sheet product having at least one ply formed of the cationic polymer membrane as described above and at least one ply of a microporous polymeric sheet which is of less than 10 mils (0.025 cm) thickness, preferably less than 5 mils (0.013 cm) and most preferably from 1 to 4 mils (0.0025 to 0.01 cm). The polymer used in forming the microporous sheet must be selected from polymers which are inert to alkaline battery components for which it is intended to be used, have a porous structure making up at least above 25 volume percent of the microporous sheet, having the majority of pores of 5 microns or less in mean diameter, and being capable of bonding to the cationic polymer membrane to form a unity structure. The bonding may be accomplished by contacting the membrane and microporous sheet at a sufficient elevated temperature to cause the polymer to be tacky but less than the melt or flow temperature of the polymer. This may be accomplished in known manners such as with the aid of a heated press or nip rollers or the like. Suitable polymers include polyolefins such as polyethylene, polypropylene and the like, polyvinyl alcohols, copolymers of ethylene-vinylacetate and the like.

Preferred microporous polymer sheet for use in the present invention are microporous polyolefin sheets such as described in U.S. Pat. Nos. 4,287,276; 3,853,601; 3,843,761; 3,679,538 and 3,558,764; the teachings of which are incorporated herein by reference.

The microporous polyolefin sheets may be in the form of a very thin, highly filled polyolefin such as described in U.S. Pat. No. 4,287,276. Such filled polyolefin sheets are preferred as they readily adhere to the cationic sheet without loss of porosity and form a multi-ply sheet product of very high stability. Such preferred microporous sheet is formed from a substantially homogeneous admixture of from about 5 to 30 weight percent polyolefin having a molecular weight of at least about 100,000 and preferably from 150,000 to about 2,000,000 with from about 10 to about 60 weight percent of a plasticizer for the polyolefin and from about 30 to about 75 weight percent of a filler which is inert to alkali material. The preferred range of each component, respectively is: 10 to 20; 20 to 40; 45 to 65. The polyolefin can be a homopolymer or copolymer, preferably having a standard load melt index of 0.5 or less (ASTM D-1238-57T), of hydrocarbon olefinic monomers such as ethylene, propylene, butene and the like and mixtures thereof or from such olefinic monomers with other olefinic monomers such as acrylonitrile, acrylic acid or esters.

The filler used in forming the microporous sheet are, generally, a high surface area particulate material having a particle size of less than about 0.01 cm and preferably less than about 0.0025 cm in diameter with a surface area of from about 1 to 950 square meters. The pore volume (BET) of the filler is preferably at least about 0.07 cc/gm with from 0.07 to 0.8 cc/gm being most preferred.

The filled, plasticized polyolefin mixture can be formed into sheets in known manners such as by extrusion, pressing and the like. The microporous nature of the sheet is imparted by extracting the plasticizer from the formed sheet. The extraction solvent and conditions should be chosen so that the polyolefin and filler are essentially insoluble. The particular solvent used will depend upon the particular component to be extracted. For example, if petroleum oil is used as the plasticizer, the following solvents are suitable to extract it from the multilayer sheet material: chlorinated hydrocarbons, such as trichloroethylene, tetrachloroethylene, carbon tetrachloride, methylene chloride, tetrachloroethane, and the like; hydrocarbon solvents such as hexane, benzene, petroleum ether, toluene, cyclohexane, gasoline, and the like. If polyethylene glycol is the plasticizer, the extraction medium can be water, ethanol, methanol, acetone, and the like.

Alternately, the microporous sheet may be formed from an unfilled polyolefin such as is described in U.S. Pat. Nos. 3,558,764; 3,679,538; 3,843,761 and 3,853,601 the teachings of which are incorporated herein by reference. The microporous polyolefin sheets, especially, polyethylene and polypropylene, can be formed by extruding, as by blown film extrusion method, a film of polyolefin with a rapid drawdown rate and ratio, uniaxially cold stretching the film, such as at a temperature in range of from about $-20°$ C. to about $25°$ C. below the crystalline melt temperature of the polyolefin to impart microporosity to the film. The resultant microporous sheet may be further processed by hot stretching, in th same direction as it was cold stretched, the previously cold stretched film at a temperature normally from about $25°$ C. below to $5°$ C. below the crystalline melt temperature. The formed microporous sheet is normally annealled by exposing the sheet under tension without stretching to a temperature normally ranging from about $40°$ C. below to about $5°$ C. below the sheets crystalline melt temperature. The resultant sheet may be further treated to increase its wetting properties in manners known in the art. Sheets formed in this manner are non-filled microporous polyolefin, preferably of polyethylene or polypropylene (most preferably, polypropylene), which normally exhibit crystallinity of at least about 30 and preferably at least about 50 percent, an average pore size of from about $10^{-6}$ cm to about $10^{-4}$ cm and a void volume of about 20 to 45 percent.

The exact composition of the resultant sheet product will depend on the original composition used to form the cationic polymer membrane and, when a multi-ply sheet product, the particular microporous polymer sheet. The multi-ply sheet product is formed by either coating the membrane forming composition directly onto the microporous sheet and causing the material to crosslink and form a sheet or coating thereon or, alternately by coextensively overlaping at least one membrane sheet and at least one microporous sheet and subjecting them to nip rollers, calendering pressing or the like process to bond the sheets together.

The resultant sheet product has been found to be capable of exhibiting inhibition to dendrite growth, high conductivity, stability to environment produced by the components of the battery, high capacity to recycling without failure and inhibition to shape change of the electrodes used in conjunction therewith. It has been proposed (although not meant to be a limitation on the invention or claims) that the unexpectedly observed ability of the presently described sheet product to inhibit shape change of the electrodes is due to the cationic membrane's ability to induce the pumping of water in the direction of the negative electrode of an alkaline battery system which, in turn, inhibits pore plugging and nonsymmetric flow within the system to thus provide a means to reduce the negative electrode shape change, one of the principal failure modes in such batteries.

The following examples are given for illustrative purposes only and are not meant to be a limitation on the invention as defined by the appended claims. All parts and percentages are by weight unless otherwise indicated.

EXAMPLE I

A cationic polymer was prepared in a similar manner to that described in U.S. Pat. No. 4,513,121 by the following steps: 25 parts of hydroxy terminated polybutadiene having a weight average molecular weight of 2,800 was diluted with 335 parts tetrahydrofuran (THF). 0.082 part rodium carbonyl [$Rh_6(CO)16$] and 34 parts of dimethylamine in an additional 63 parts THF were added to the reaction mixture. The mixture was placed in a 2 liter autoclave with a 2 liter reserve and stirring capability which was then sealed and charged witn a 50:50 mixture of CO and $H_2$ to produce 1000 psi at ambient temperature. The temperature was raised to 150° C. over a 90 minute period and then retained at that temperature for about 4 hours. The polymer product was removed and analyzed by acid titration and NMR which showed that about 61% of the olefinic groups of the original polymer were aminomethylated and the polymer was substantially free of olefinic groups. Approximately 41 parts of polymer product was formed.

8 parts of formed polymer were placed in 92 parts THF and 6.22 parts epichlorohydrin was added along with 92 parts water and the mixture heated for 1.5 hours at 65° C. The resultant polymer reaction mixtue was a two phase system with polymer product in the aqueous phase. The THF was evaporated to make a water polymer solution having 14% polymer. This solution was diluted to 6.5% concentration.

Titration of the polymer showed that 75% of the amine groups were quarternized.

EXAMPLE II

A portion of the solution of Example 1 above was used to form a free standing film of cationic polymer by adding 1 part t-butyl hydrogen peroxide per 1000 parts polymer to the solution and then casting a film on a polyester (Mylar) substrate. The film was removed and placed on a tetrafluoroethylene (Teflon) support and crosslinked by subjection to 140° C. for 30 minutes. The resultant film was removed from the support and was tound to be absent of chloride and was thus completely crosslinked. The polymer was insoluble in water.

EXAMPLE III

A sample of a microporous sheet was formed by introducing into a B-Banbury mixer 10 parts of commercially available high density polyethylene (MW of 250,000), 5 parts of commercially available high density polyethylene (MW of about 2,000,000) and 38 parts of low aromatic, saturated hydrocarbon petroleum oil (Shellflex 411; 547 SSU at 110° F.) as the processing plasticizer and 0.1 part of Santonox followed by 47 parts of titanium dioxide (P-25; 5% rutile, 95% anatase, density 4.3, BET surface area 280 $m^2$/cc, BET pore volume 0.35 cc/g, average pore diameter 212A). After complete addition of the components, they were compounded in the mixer at 400° F. for about 8 minutes. The resultant composition was removed from the mixer, cooled, and ground to a coarse powder in a Wiley mill. The powder was fed into a one inch single screw extruder, operated at 400° F., and extruded as pellets which were passed through two 40 mesh (U.S. Standard) screens to remove any large agglomerates. The pellets were subjected to a second extruder similar to the first, except that it was equipped with a sheeting die capable of forming sheet material. The sheet was passed over 2 annealing rolls maintained at 200° F. and then 3 cooling rolls. The sheet product was immersed in 1,1,1-trichloroethane for 30 minutes, air dried, and then immersed in a second fresh bath of trichloroethane for 30 minutes. Samples of the extracted sheet were analyzed and showed that greater than 90 percent of the plasticizer was removed. The resultant sheet was 2 mils in thickness.

EXAMPLE IV

A portion of an aqueous polymer (14% solid) solution forming in a similar manner as described in Example 1 above was used to form a free standing laminated separator by casting the cationic polymer onto a microporous polyethylene sheet. The polymer used here had an amine incorporation of 49% and was 58% quaternized. To the cationic polymer solution (30 parts) was added 0.04 part t-butyl hydrogen peroxide. The solution was poured onto the $TiO_2$ filled polyethylene microporous sheet material of Example III above. The solution was spread over the entire microporous sheet using a gardner knife pulled with a rod to produce a resultant 1 mil thick coating on the sheet. The film was allowed to air dry in a dust free environment and then heated at 90° C. for 2 hours to effect crosslinking and curing of the cationic material. The resultant product was a unitary film of 3 mils thickness which exhibited good mechanical and physical properties. The results of each of the three films (Examples II, III and IV are given in Table 1 below).

TABLE 1

| | | Properties and Performance of Separators | | | | | | |
|---|---|---|---|---|---|---|---|---|
| | | Electrolytic Resistivity | | Dendrite Penetration | $t_{K^+}$ | $t_{OH^-}$ | $t_{H_2O}$ (electro- | Battery Testing Results | |
| Sample | Thickness mil | ohm cm | ohm in$^2$ | Resistance, min | ($K^+$ trans-ference #) | ($OH^-$ trans-ference #) | osmotic coefficient) | Cycles to Failure | % Shape Change/Cycle |
| Ex. II | 3.4 | 29.4 | 0.039 | 200 | 0.13 | 0.87 | −0.75 | — | — |
| Ex. IV #1 Hybrid (1 mil coating on 2 mil microporous 12685-91) | 3.0 | 17.9 | 0.021 | 200 | 0.15 | 0.85 | −0.63 | 100 | 0.32 |
| Ex. III (Comparison Microporous | 2.0 | 10 | 0.008 | 10 | 0.32 | 0.68 | −0.42 | 100 | 0.34 |

What is claimed is:

1. A sheet product comprising
   (a) at least one ply formed of a cationic, water insoluble polymer membrane of less than 10 mils (0.025 cm) thickness and having at least about 4 weight percent based on the total weight of the polymer of cationic groups in the form of quaternary ammonium groups and said polymer is substantially free of hydrolyzable groups; and
   (b) at least one ply formed of a microporous polyolefin polymer sheet of less than about 10 mils (0.025 cm) thickness which is substantially free of filler and stable to alkaline conditions, said plies (a) and (b) being coextensive and bonded to each other to form a multi-ply product.

2. The sheet product of claim 1, wherein component (a) is a sheet of 0.1 mil (0.00025 cm) to 5 mils (0.013 cm) thickness and formed from a cationic polymer derived from a homopolymer or copolymer of polybutadiene or isoprene.

3. The sheet product of claim 1, wherein the cationic polymer forming component (a) is a polymer having substantially completely saturated polymeric backbone chain with pendant akylene amine groups represented by the formula:

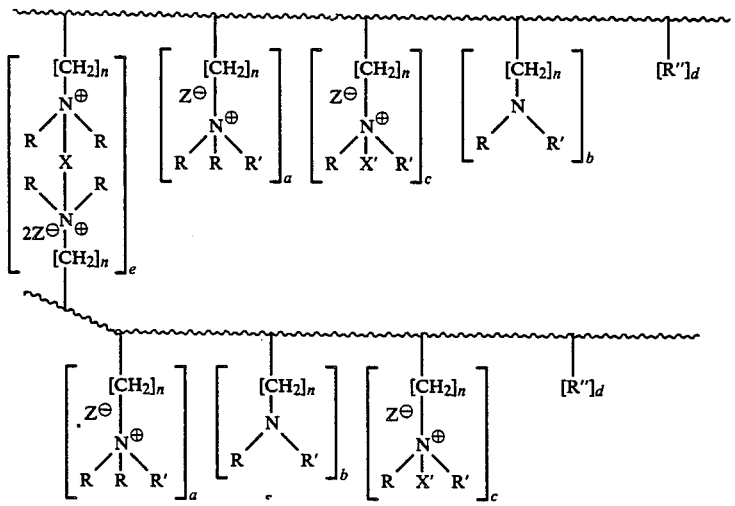

wherein each R independently represents a $C_1$–$C_6$ alkyl, cycloalkyl, or aryl group; R' represents hydrogen or an R group; R" represents hydrogen or comonomer pendant group or both; X is a residual organic group of a polyfunctional compound capable of reacting with at least two amino groups of the polyamine; X' is a residual organic group having at least one unreacted functional group capable of reacting with secondary or tertiary amine or secondary hydroxyl group; represents a substantially saturated hydrocarbon polymer chain; Z represents a counterion; n is an integer of from 1 to 3, preferably 1; and a, b, c, d and e are each integers such that a and b are each from about 1 to 90 percent, c is up to about 1 to 60 percent and e is from about 1 to 30 percent of the total sum of a+b+c+d+e and the sum of the groups a, b and c is at least 4 weight percent of the polymer product.

4. The sheet product of claim 3, wherein component (a) is a sheet of 0.1 mil (0.00025 cm) to 5 mils (0.013 cm) thickness and formed from a cationic polymer derived from a homopolymer or copolymer of polybutadiene or isoprene.

5. The sheet product of claim 3, wherein component (b) is a sheet of 1 mil (0.0025 cm) to 5 mil (0.013 cm) thickness and is formed from a high density or high crystallinity polyolefin.

6. The sheet product of claim 3 wherein each R independently represents a $C_1$–$C_3$ alkyl and the sum of groups a, b and c is at least 10 weight percent of the polymer.

7. The sheet product of claim 1, wherein component (b) is a sheet of 1 mil (0.0025 cm) to 5 mil (0.013 cm) thickness and is formed from a high density or high crystallinity polyolefin.

8. In a storage battery having positive electrodes, negative electrodes, an electrolytic composition and separators positioned between adjacent electrodes of opposite polarity, wherein the improvement comprises that the separator is composed of a sheet product of claim 6.

9. In a storage battery having positive electrodes, negative electrodes, an electrolytic composition and separators positioned between adjacent electrodes of opposite polarity, wherein the improvement comprises that the separator is composed of a sheet product of claim 3.

10. In a storage battery having positive electrodes, negative electrodes, an electrolytic composition and separators positioned between adjacent electrodes of opposite polarity, wherein the improvement comprises that the separator is composed of a sheet product of claim 1.

11. A sheet product comprising
(a) at least one ply formed of a cationic, water insoluble polymer membrane of less than 10 mils (0.025 cm) thickness and having at least about 4 weight percent based on the total weight of the polymer of cationic groups in the form of quaternary ammonium groups and said polymer is substantially free of hydrolyzable groups; and
(b) at least one ply formed of a microporous polymer sheet of less than about 10 mils (0.025 cm) thickness which is stable to alkaline conditions and composed of a substantailly homogeneous admixture of from 7 to 40 weight percent of a polyolefin of a weight average molecular weight of at least 100,000, from 0 to 10 weight percent of a plasticizer for the polyolefin and from 50 to 93 weight percent of an inert particulate filler, said plies (a) and (b) being coextensive and bonded to each other to form a multi-ply sheet product.

12. The sheet product of claim 11, wherein component (a) is a sheet of 0.1 mil (0.00025 cm) to 5 mils (0.013 cm) thickness and formed from a cationic polymer derived from a homopolymer or copolymer of polybutadiene or isoprene.

13. The sheet product of claim 11, wherein the cationic polymer forming component (a) is a polymer having substantially completely saturated polymeric backbone chain with pendant alkylene amine groups represented by the formula:

polyfunctional compound capable of reacting with at least two amino groups of the polyamine; $X'$ is a residual organic group having at least one unreacted functional group capable of reacting with secondary or tertiary amine or secondary hydroxyl group; ∼∼∼ represents a substantially saturated hydrocarbon polymer chain; Z represents a counterion; n is an integer of from 1 to 3, preferably 1; and a, b, c, d and e are each integers such that a and b are each from about 1 to 90 percent, c is up to about 1, preferably less than 0.5 percent, d is from about I to 60 percent and e is from about 1 to 30 percent of the total sum of $a+b+c+d+e$ and the sum of the groups a, b and c is at least 4 weight percent of the polymer product.

14. The sheet product of claim 13, wherein component (a) is a sheet of 0.1 mil (0.00025 cm) to 5 mils (0.013 cm) thickness and formed from a cationic polymer derived from a homopolymer or copolymer of polybutadiene or isoprene.

15. The sheet product of claim 13, wherein component (b) is a sheet of 1 mil (0.0025 cm) to 5 mil (0.013 cm) thickness and is formed from a high density or high crystallinity polyolefin.

16. The sheet product of claim 13, wherein component (b) is a sheet of 1 mil (0.0025 cm) to 5 mil (0.013 cm) thickness and is formed of an admixture of a processing plasticizer selected from a petroleum oil and low molecular weight polymers and mixtures thereof, a filler selected from carbon black, coal dust, graphite, oxides and hydroxides of silicon aluminum, calcium, magnesium, boron, titanium or mixtures thereof and the polyolefin is selected from polyethylene or polypropylene or mixtures thereof such that said polyolefin has a standard load melt index of about 0.5 or less.

17. The sheet product of claim 13 wherein each R independently represents a $C_1$-$C_3$ alkyl and the sum of groups a, b and c is at least 10 weight percent of the polymer.

18. The sheet product of claim 11, wherein component (b) is a sheet of 1 mil (0.0025 cm) to 5 mil (0.013 cm) thickness and is formed from a high density or high crystallinity polyolefin.

19. The sheet product of claim 11, wherein compo-

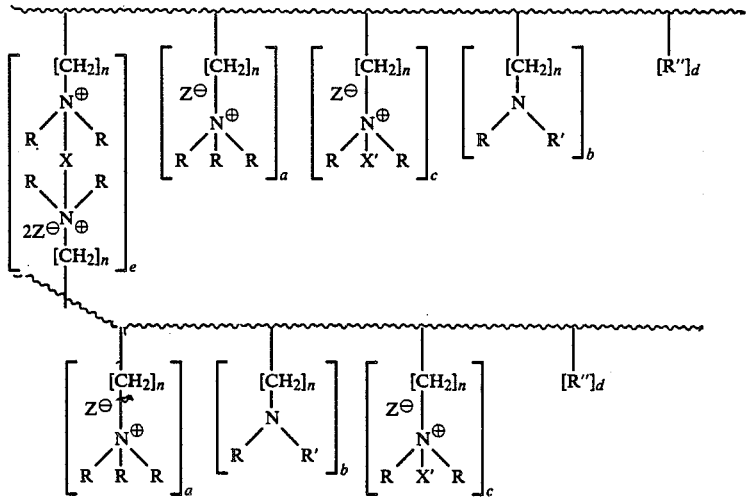

wherein each R independently represents a $C_1$-$C_6$ alkyl, cycloalkyl or aryl group; $R'$ represents hydrogen or an R group; $R''$ represents hydrogen or comonomer pendant group or both; X is a residual organic group of a nent (b) is a sheet of 1 mil (0.0025 cm) to 5 mil (0.013 cm) thickness and is formed of an admixture of a processing plasticizer selected from a petroleum oil and low molecular weight polymers and mixtures thereof, a filler selected from carbon black, coal dust, graphite, oxides and hydroxides of silicon aluminum, calcium, magnesium, boron, titanium or mixtures thereof and the polyolefin is selected from polyethylene or polypropylene or mixtures thereof such that said polyolefin has a standard load melt index of about 0.5 or less.

20. In a storage battery having positive electrodes, negative electrodes, an electrolytic composition and separators positioned between adjacent electrodes of opposite polarity, wherein the improvement comprises that the separator is composed of a sheet product of claim 16.

21. In a storage battery having positive electrodes, negative electrodes, an electrolytic composition and separators positioned between adjacent electrodes of opposite polarity, wherein the improvement comprises that the separator is composed of a sheet product of claim 11.

22. In a storage battery having at least one positive and at least one negative electrode, an electrolytic composition and separators positioned between adjacent electrodes of opposite polarity, wherein the improvement comprises that the separator is composed of a sheet product composed of a sheet of less than 10 mils (0.025 cm) thickness formed from a cationic, water-insoluble polymer which is substantially free of hydrolyzable groups and with the pendant alkylene amine groups represented by the formula:

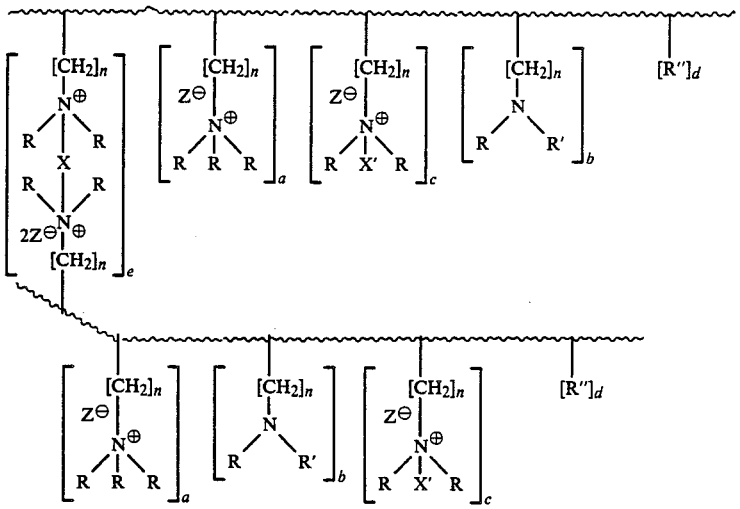

wherein each R independently represents a $C_1-C_6$ alkyl, cycloalkyl or aryl group; R' represents hydrogen or an R group; R" represents hydrogen or comonomer pendant group or both; X is a residual organic group of a polyfunctional compound capable of reacting with at least two amino groups of the polyamine; X' is a residual organic group having at least one unreacted functional group capable of reacting with secondary or tertiary amine or secondary hydroxyl group; ∽∽∽ represents a substantially saturated hydrocarbon polymer chain; Z represents a counterion; n is an integer of from 1 to 3, preferably 1; and a, b, c, d and e are each integers such that a and b are each from about 1 to 90 percent, c is up to about 1, preferably less than 0.5 percent, d is from about 1 to 60 percent and e is from about 1 to 30 percent of the total sum of $a+b+c+d+e$ and the sum of the groups a, b, and c is at least 4 weight percent of the polymer product.

23. The storage battery of claim 22 wherein the cationic polymer contains R groups independently selected from $C_1-C_3$ alkyl and the sum of groups a, b and c is at least 10 weight percent of the polymer.

* * * * *